United States Patent [19]

Micheron et al.

[11] 4,205,242
[45] May 27, 1980

[54] ELECTRET BISTABLE SYSTEM

[75] Inventors: Francois Micheron; Jean L. Bruneel; Pierre Leclerc, all of Paris, France

[73] Assignee: Thomson-CSF, Paris, France

[21] Appl. No.: 866,341

[22] Filed: Jan. 3, 1978

[30] Foreign Application Priority Data

Jan. 4, 1977 [FR] France ............................... 77 00076

[51] Int. Cl.² ...................... G11C 13/02; H01H 36/00
[52] U.S. Cl. .................................. 307/400; 200/181
[58] Field of Search ......................... 307/88 ET, 400; 365/146; 200/181; 361/233

[56] References Cited

U.S. PATENT DOCUMENTS 4,065,677  12/1977  Micheron et al. .................... 200/181
4,078,183  3/1978  Lewiner et al. ...................... 200/181

OTHER PUBLICATIONS

Proceedings of The West Virginia Academy of Science vol. 40; pp. 338-344.

Primary Examiner—James W. Moffitt
Attorney, Agent, or Firm—Cushman, Darby & Cushman

[57] ABSTRACT

The invention relates to electret bistable systems comprising two fixed electrodes forming a capacitor. A sheet of electret material is inserted for creating holding forces in two rest positions of a moving element located in the capacitor gap. In accordance with the invention, the electret sheet is separated from the corresponding fixed electrode by a layer of dielectric which can be an air gap. As a variant, the charge density of the electret sheet may be concentrated in islands for reducing the holding forces.

8 Claims, 10 Drawing Figures

ELECTRET BISTABLE SYSTEM

The invention relates to electret bistable devices comprising at least one sheet of electret inserted between two fixed electrodes belonging to an electrode system and connected to electric polarization means for tripping a movable armature from a first rest position near one fixed electrode to a second rest position near the other fixed electrode.

An electret is a dielectric substance bearing a permanent charge, it may be obtained from a sheet of dielectric, e.g. polypropylene. A permanent charge, localized near the surfaces, is obtained by corona discharge or by electron or ion implantation.

When an electret encounters an electrode, it tends to stick to it, since the electrode becomes electrostatically charged. In order to detach the sheet of electret and move it over to the other electrode, the two electrodes are polarized by charges having opposite signs so as to counteract the charges produced in the first electrode. To this end, the electrodes are connected to an electric generator. The resulting bistable device comprises a movable armature consisting of the sheet of electret. Alternatively, an electrostatic bistable device having two sheets of electret can be constructed, one sheet being placed on each inner face of the two fixed electrodes, the movable armature comprising a third electrode which trips towards one or the other electret sheet, depending on the voltages supplied to the three electrodes.

Devices of the kind in question can be used to switch an electric current, electromagnetic radiation or a fluid, or for storing or displaying numerical data. The main advantages of an electret bistable device, compared with electromechanical devices serving the same purposes, are the low cost and the very low consumption of energy for switching. On the other hand, the tripping voltage pulse needs to have a high amplitude, which is incompatible e.g. with control circuits for existing display panels.

The invention relates to bistable devices comprising means for considerably reducing the switching voltages.

In accordance with the present invention, there is provided an electret bistable system comprising: a moving element inserted between two fixed electrodes forming a capacitor, at least one layer of electret material arranged within said capacitor for holding said moving element in anyone of two rest positions, and means positioned within said capacitor for lowering the electrostatic holding force created by said layer of electret material.

For a better understanding of the present invention and to show how the same may be carried into effect, reference will be made to the following description and the accompanying drawings among which:

Figures 1A, 1B:
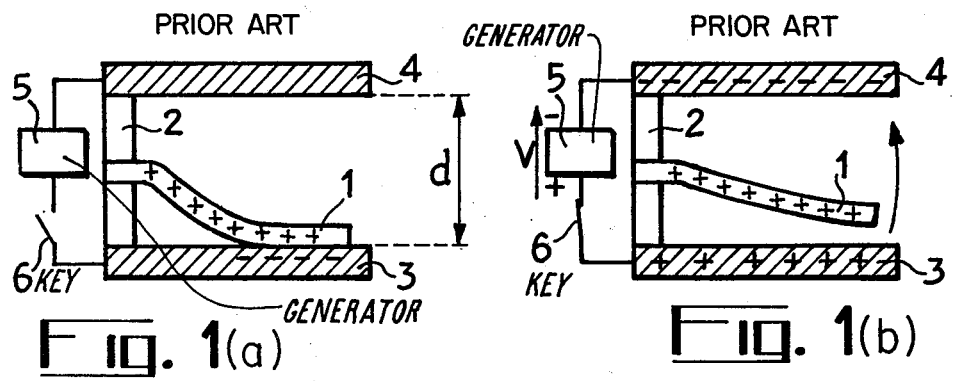
FIGS. 1a, 1b and 1c show the operating characteristics of a known bistable device.
Figure 1C:
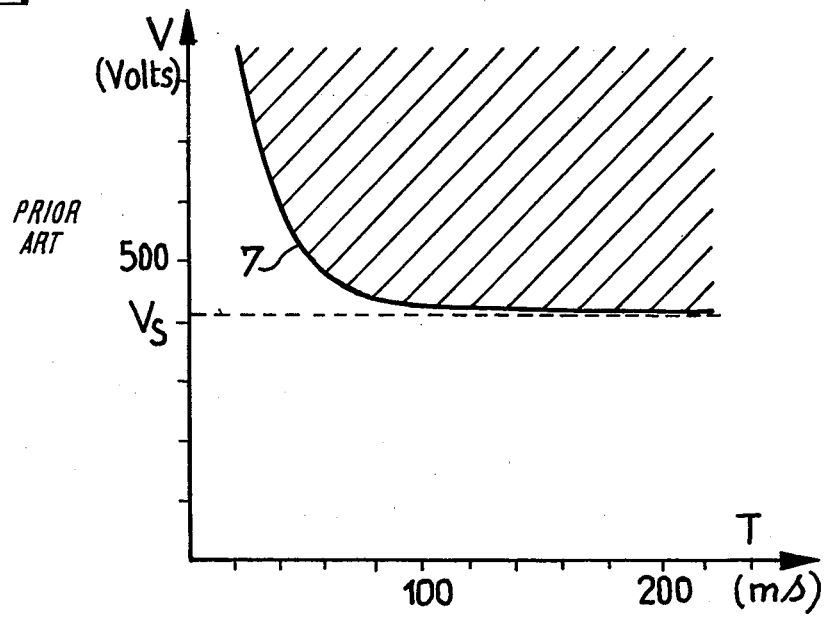

FIGS. 1a and b show a known electret bistable device. A flexible reed 1 made of a dielectric material bearing permanent positive charges is secured in a holder 2 between two fixed parallel electrodes 3, 4 separated by a distance d. The electrodes are connected by a switch 6 to a pulse generator 5 having a high impedance Z. In FIG. 1a the switch is open and reed 1 remains permanently in contact with electrode 3. In FIG. 1b, the switch is closed and a pulse of amplitude V and duration T is applied between the electrodes. The positive charges introduced in electrode 3 and the negative charges introduced in electrode 2 cause reed 1 to switch over if the values of V and T are sufficient, as shown by the experimental diagram in FIG. 1c. The crosshatched region contains the amplitude-duration values which are sure to produce a switch-over. Curve 7 gives the switching voltage amplitude for a given time, i.e. the minimum switching voltage. In the example in question, where the distance d between electrodes is of the order of 5 mm, the surface area of the electrodes is of the order of a cm$^2$ and the electret charge densities are of the order of $10^{-9}$ C/cm$^2$, the required switching voltages are of the order of 500 to 1000 V. A "threshold" voltage $V_s$ exists, below which it is impossible to switch over, irrespective of the duration of the pulse.

Figure 2:
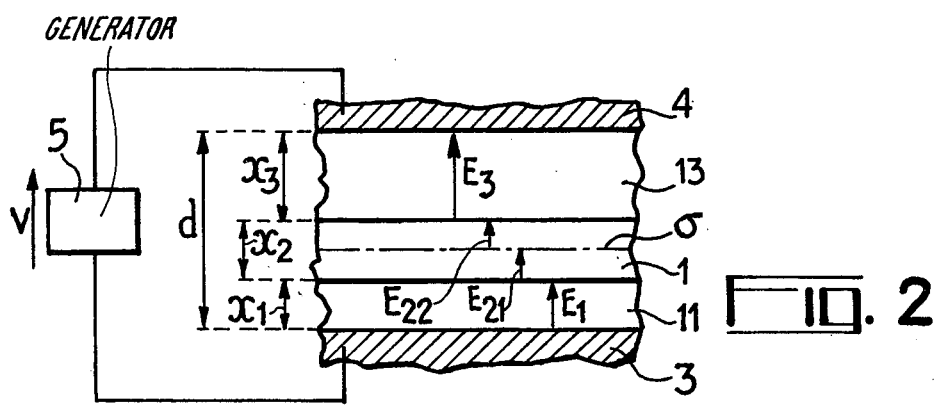
FIG. 2 is an explanatory diagram.

The threshold voltage can be accurately calculated from FIG. 2, which shows two parallel electrodes 3, 4 having a surface area S, separated by a distance $d = x_1 + x_2 + x_3$ and connected to a generator 5 supplying a voltage V and an electret 1 parallel to the electrodes and having a thickness $x_2$. It is assumed that the electret is not subjected to any mechanical force such as return or gravitational forces. The region 11 between electret 1 and electrode 3 has a thickness $x_1$ and is formed from a substance having a dielectric constant $\epsilon_1$. The region 13 between electret 1 and electrode 4 has a thickness $x_3$ and is formed from a substance having a dielectric constant $\epsilon_3$. It is also assumed that the dielectric constant of the electret is uniform and equal to $\epsilon_2$ and that the electret is charged with only one type of charges, distributed in its central plane, the value of the surface charge being $\sigma$. An electric field $E_1$ is between electrode 3 and electret 1, and similarly there is an electric field $E_3$ between electrode 4 and electret 1, a field $E_{21}$ between region 11 and the centre plane of the electret, and a field $E_{22}$ between region 13 and the centre plane of the electret. The aforementioned electric fields, the forces $F_1$, $F_3$ exerted by electret 2 on electrodes 3, 4 respectively and the force $F_2$ exerted on the electret by the two electrodes are calculated in the article by G. M. SESSLER (J. Appl. Phys. Vol. 43, No. 2, February 1972). Assuming that the electret is in a stable position, the minimum voltage V for moving it is the voltage which counteracts the force $F_2$. It can be shown that this voltage is independent of the surface area S of the electrode. It depends more particularly on $\sigma$, $\epsilon_1$, $\epsilon_2$, $\epsilon_3$.

FIGS. 3, 4, 5a, 5b, 6a and 6b show embodiments of electrostatic bistable devices for reducing the voltage V relative to the structure in FIGS. 1a and 1b.

Figure 3:
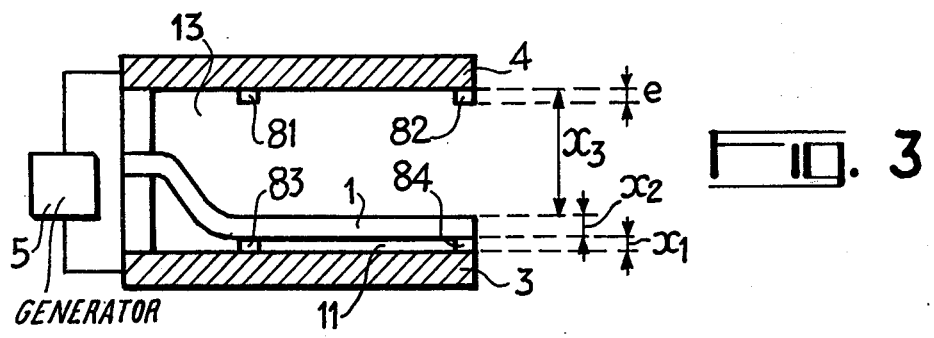
FIGS. 3, 4, 5a, 5b, 6a and 6b are embodiments of bistable devices in which the electret does not adhere to the two electrodes.

In FIG. 3, thin spacers 81, 82, 83 and 84 are deposited on electrodes 3, 4 so as to form an air gap having the thickness e for each stable position of the electret relative to one of the electrodes. When the electret is in a stable position near electrode 3, we have $x_1 = e$ and $\epsilon_1$ and $\epsilon_3$ are equal to the dielectric constant of air. The threshold voltage can be calculated as follows:

$$V = \tfrac{1}{2}(\epsilon_2^2/\epsilon_0\epsilon_1)(x_1-x_3)\sigma$$

where $\epsilon_0$ is the dielectric constant of vacuum.

At a given value of $x_3$, the threshold voltage V varies inversely with $x_1$. However, spacers 81, 82, 83, 84 must not introduce non-uniformities into the electric fields in the direction parallel to the electrodes. This means that $x_1$ must be small compared with $x_3$, so that the reduction in voltage cannot exceed 10–20%.

Figure 4:
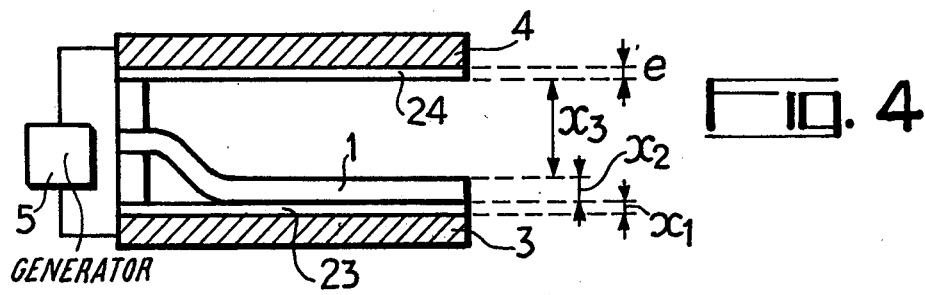

In FIG. 4, instead of providing a free air gap between the electret and the electrode, a layer of solid dielectric having the thickness e is deposited on each electrode, i.e. a layer 23 on electrode 3 and a layer 24 on electrode 4. Preferably the materials used have a resistivity comparable with that of the electret and have a high dielectric constant, e.g. lithium niobate ($\epsilon_1 = 30$) or barium titanate ($\epsilon_1 = 200$) deposited by vaporization, or polyvinylidene chloride ($\epsilon_1 = 10$). Alternatively, the electrodes can be coated with parylene ($\epsilon_1 = 3$) or stuck to a sheet of polypropylene.

As in the preceding case, $x_1 = e$ and must be small compared with $x_3$ so that the field $E_3$ is not perturbed by the dielectric layer 24. V is calculated as follows:

$$V = (\epsilon_2^2 \sigma x_3/\epsilon_0\epsilon_1) \pm (\epsilon_2^2 \sigma x_3/\epsilon_0)(1/\sqrt{\epsilon_1\epsilon_3})$$

where
$\epsilon_1$ is the dielectric constant of material 23,
$\epsilon_3$ is the dielectric constant of air and
$\epsilon_2$ is the dielectric constant of the electret.

The threshold voltage is a decreasing function $\epsilon_1$. In an embodiment with $x_3 = 5$ mm, $x_2 = 10$ μm and $x_1 = 10$ μm, the threshold voltage was reduced by a factor greater than 3 for $\epsilon_1 = 10$.

Figure 5A:
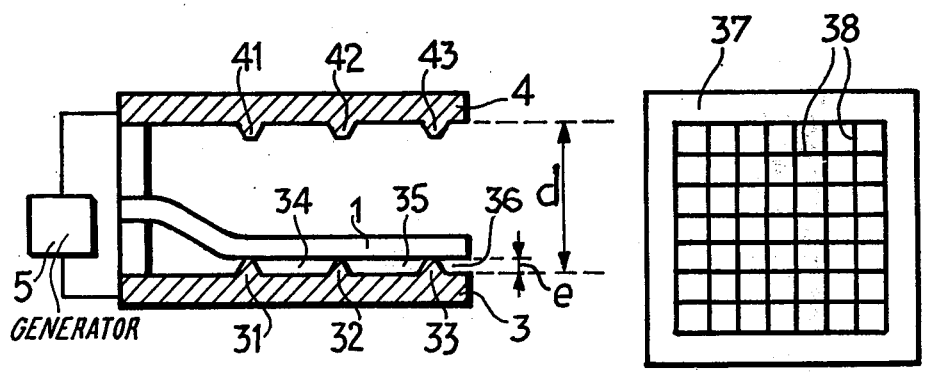
Figure 5B:
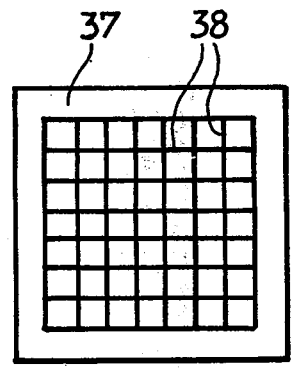

The previously described two embodiments can reduce the attraction between the electret and an electrode by interposing between them a material having a dielectric constant of at least unity, over a uniform thickness. Experience has shown that the threshold voltage can be reduced by reducing the area of contact between the electret and the electrode. FIGS. 5a and 5b show an embodiment of a bistable device wherein the contact is thus reduced. In FIG. 5a the surfaces of electrodes 3 and 4 are not flat but have tips 31, 32, 33, 41, 42, 43 between which air gaps form. If, for example, the electret is in contact with tips 31, 32, 33 of electrode 3, gaps 34, 35, 36 form. This tip configuration is substantially equivalent to spacers on the electrode. Consequently, the attraction between electrode 3 and the electret is weaker than in the case of a flat electrode. When a voltage V is applied between the electrodes, it is found that the threshold voltage decreases by approx. 20% compared with flat electrodes. The aforementioned surface state of the electrodes can be obtained e.g. by means of grids. FIG. 5b shows the surface of an electrode. Intersecting metal wires are disposed on a metal support 37 and form a grid 38. The thickness and the points of intersection of the wires can be varied to obtain the described surface state, shown in section in FIG. 5a. As in the case of spacers, the height of tips e must be small compared with the distance d between electrodes, e.g. d = 1 cm and e = ≦ 1 mm.

Figures 6A, 6B:
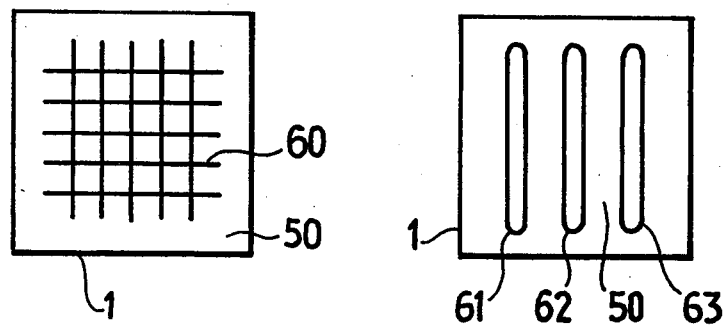

A similar result is obtained by using flat electrodes and reducing the charged area of the electret compared with its total area, by implanting localized charges either by the corona method or by implantation of ions or electrons, using masking devices which can give well-defined surfaces of the order of a cm². The optimum surface charge, either distributed or in the form of localized charges for easily obtaining reproducible electrets, is of the order of $10^{-9}$ C/cm². It is difficult to obtain lower values in reproducible manner, owing to the previous history of the sheet of electret, which has been charged to a varying extent by friction, unsticking and the like. The reduction in the charged area of electret results in a reduction in the threshold voltage, just as if the surface charge had been reduced. The reduction is of the same order as with non-flat electrodes. By way of non-limitative example, FIGS. 6a and 6b show two possible charge configurations in the centre plane of the electret. In FIG. 6a the charges are distributed in a grid 60 in the center plane 50 of the electret sheet 1. In 6b, the distribution in the center plane 50 is along three lines 61, 62, 63.

Of course, some of the aforementioned embodiments can be combined. For example, a bistable device can be constructed wherein the electrodes are covered with a layer of dielectric material and an electret has localized charges, thus even further reducing the switching voltage.

In all cases, it is preferable to make the electret of a material having a low dielectric constant $\epsilon_2$, e.g. polypropylene ($\epsilon_2 = 2$), since the threshold voltage is proportional to $\epsilon_2^2$.

Figure 7:
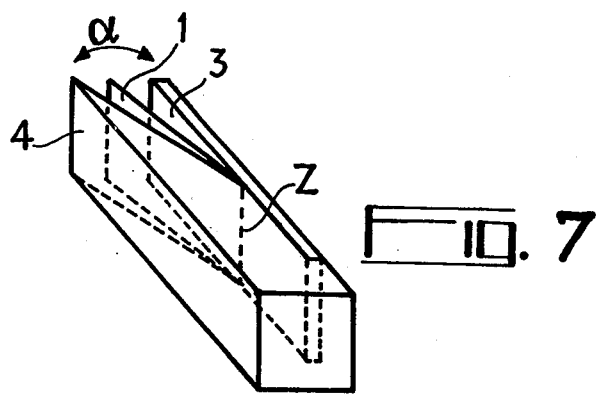
FIG. 7 shows a dihedral bistable device.
Figure 8:
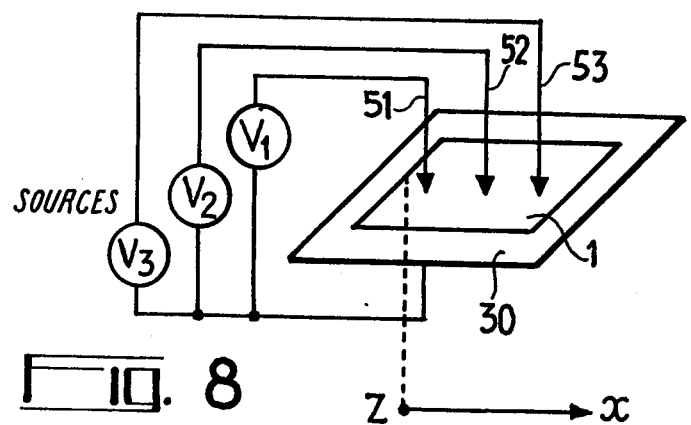
FIG. 8 shows a method of implanting charges in the electret.

In order to simplify the description, all the described examples relate to a bistable configuration wherein the electrodes and electrets are parallel. Depending on the application, other configurations may be conceived. By way of example, FIG. 7 shows a bistable device wherein the electrodes 3, 4 form a dihedral angle α. A sheet of electret 1 forming a flap is secured between the electrodes and can tilt around a vertical axis Z, thus encounteracting gravity. The operation of a dihedral bistable can easily be inferred from the operation of a bistable having parallel electrodes, provided that the charge distribution decreases along the electret. A decreasing distribution is obtainable when the distribution is continuous, as in the case of localized charges. FIG. 8 diagrammatically shows a device for implanting localized charges by the corona effect. The electret sheet 1 is disposed between a flat electrode 30 and tips 51, 52, 53 maintained at potentials $V_1$, $V_2$, $V_3$ respectively relative to electrode 30, for times $t_1$, $t_2$, $t_3$ respectively. In order to decrease the charge, we can make $V_1 = V_2 = V_3$ and $t_1 > t_2 > t_3$, or $t_1 = t_2 = t_3$ and $V_1 > V_2 > V_3$. In the case of electron or ion implantation by means of masking devices, a variation is made either in the intensities of the energy beams or in the implantation times. In all cases, care is taken that the charge decreases at the rate 1/x, x being the distance between the charge and the dihedron axis Z. However, experience shows that the bistable device operates equally well with constant charges, except that the threshold voltage is then higher.

Figure 9A:
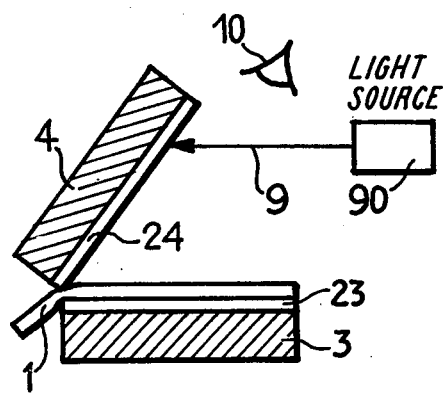
FIGS. 9a and 9b show a bistable device used for data display.
Figure 9B:
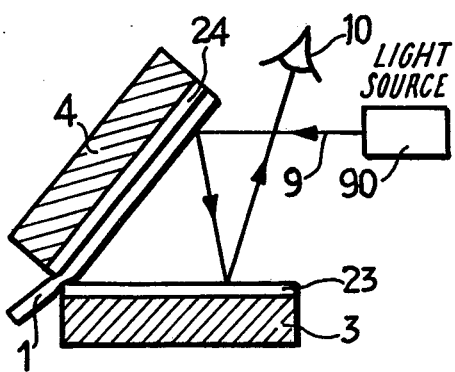

FIGS. 9a and 9b show a dihedral bistable device according to FIG. 7, used for data display.

In FIG. 9a, electret 1 is near electrode 3. A light ray 9 from a source 90 reaches electrode 4 but is not reflected thereby since the electrode does not reflect. An observer 10 does not receive light. In FIG. 9b, electrode 1 is near electrode 4. The visible surface of the electret is therefore the reflecting surface. The same light ray 9 is thus reflected by the electret and by electrode 3 and is received by the observer 10. The resulting device is an electrically controlled light shutter which can be used for light display.

In a practical embodiment, use was made of a reflecting electrode 3 comprising a sheet of glass 1 mm thick covered with a conducting layer of tin oxide and a sheet of electret measuring 1 cm×1 cm bearing a uniform surface charge $\sigma = 10^{-9}$ C/cm$^2$. Electrodes 3 and 4 were covered with layers of lithium niobate 23, 24 about 10 microns thick. The angle $\alpha$ between the two electrodes was 30° and the minimum amplitude of a tripping pulse lasting 50 ms was less than 150 V, and is thus compatible with plasma panel control circuits. If there were no layer of dielectric on each electrode, the corresponding amplitude would be of the order of 500 V. If the electret used has a decreasing charge distribution, the amplitude is further reduced by a factor of approx. 2.

Figure 10A:
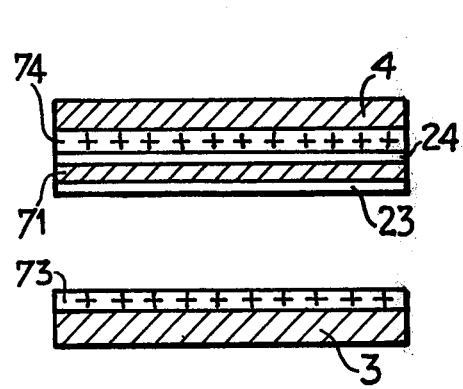
FIGS. 10a and 10b show another kind of electrostatic bistable device.
Figure 10B:
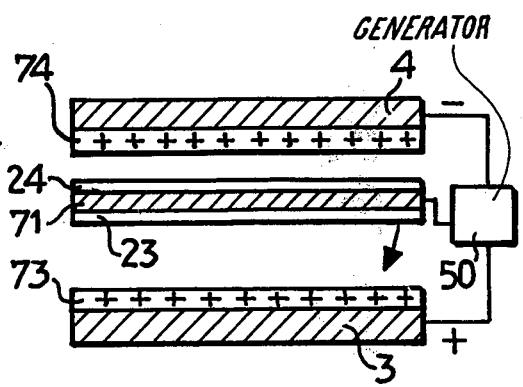

The various aforementioned embodiments are also applicable to other kinds of electrostatic bistable devices, e.g. as shown in FIGS. 10a and 10b. The device in question comprises two electrodes 3, 4, the inner surfaces of which each bear an electret sheet 73, 74 respectively, the sheets having the same charge (e.g. positive), the device also comprising a third electrode 71 or movable armature. Two layers of dielectric material 23, 24 are disposed on opposite sides of electrode 71 as in the embodiment in FIG. 4. One of the stable positions in shown in FIG. 10a. Electrode 71 is held near electret 74 by electrostatic force. In FIG. 10b, the three electrodes 3, 4 71 are connected to polarization means 50 so that, relative to electrode 71, electrode 3 is positively charged and electrode 4 is negatively charged. The movable electrode trips towards electret 73. The dielectric layers 23, 24 reduce the control voltage required for tripping.

What we claim is:

1. Electret bistable system comprising:
   a moving element inserted between two fixed electrodes forming a capacitor:
   at least one layer of electret material arranged within said capacitor for holding said moving element in either of two rest positions; and
   means positioned within said capacitor for lowering the electrostatic force holding said moving element near one of said two fixed electrodes, said force being created by said layer of electret material, said means comprising spacer means interposed between said moving element and said two fixed electrodes respectively in said two rest positions, said spacer means comprising solid dielectric layers deposited on the inner faces of said fixed electrodes.

2. Electret bistable system comprising:
   a moving element inserted between two fixed electrodes forming a capacitor:
   at least one layer of electret material arranged within said capacitor for holding said moving element in either of two rest positions; and
   means positioned within said capacitor for lowering the electrostatic force holding said moving element near one of said two fixed electrodes, said force being created by said layer of electret material, said means comprising spacer means interposed between said moving element and said two fixed electrodes respectively in said two rest positions, said spacer means comprising spacers forming air gaps between said moving element and said two fixed electrodes in said two rest positions, respectively.

3. System as claimed in claim 2, wherein said spacers are cut from a solid dielectric material; said spacers being fastened to the inner faces of said fixed electrodes.

4. System as claimed in claim 2, wherein said spacers are made by a tip configuration of the inner faces of said fixed electrodes.

5. Electret bistable system comprising:
   a moving element inserted between two fixed electrodes forming a capacitor; and
   at least one layer of electret material arranged within said capacitor for holding said moving element in either of two rest positions; and
   means positioned within said capacitor for lowering the electrostatic force holding said moving element near one of said two fixed electrodes, said force being created by said layer of electret material, said means comprising in the extent of said layer of electret material areas of substantially reduced charged density, said areas surrounding islands of higher charge density.

6. Electret bistable system comprising:
   a moving element inserted between two fixed electrodes forming a capacitor having the form of a dihedron;
   at least one layer of electret material arranged within said capacitor for holding said moving element in either of two rest positions; and
   means positioned within said capacitor for lowering the electrostatic force created by said layer of electret material and holding said moving element near either of said two fixed electrodes, said force being created by said layer of electret material
   said moving element being a flap pivoting between said fixed electrodes about the axis of said dihedron.

7. System as claimed in claim 6, wherein the charge density carried by said layer of electret material decreases radially with distance from said axis.

8. Electret bistable system comprising:
   a moving electrode inserted between two fixed electrodes forming a capacitor;
   two layers of electret material respectively covering the inner faces of said fixed electrodes for holding said moving electrode in either of two rest positions; and
   means positioned within said capacitor for lowering the electrostatic force holding said moving electrode near said two layers of electret in said two rest positions, respectively said force being created by said layer of electret material.

* * * * *